United States Patent [19]

Cripe

[11] 4,102,528

[45] Jul. 25, 1978

[54] COMBINED LOG SKIDDER AND LOADER

[76] Inventor: Gerald Edwin Cripe, Rte. 1, Troy, Mont. 59935

[21] Appl. No.: 768,156

[22] Filed: Feb. 14, 1977

[51] Int. Cl.² ............................................. B66C 1/42
[52] U.S. Cl. .................................. 254/139.1; 212/7; 214/92; 214/147 R
[58] Field of Search .......... 214/3, 3.1, 147 R, 147 G, 214/147 AS, 145 R, 92, 85.5, 523; 212/7; 254/139.1

[56] References Cited

U.S. PATENT DOCUMENTS

| | | | |
|---|---|---|---|
| 3,281,119 | 10/1966 | Westfall | 214/147 R X |
| 3,781,056 | 12/1973 | Ransford | 212/7 X |
| 3,841,507 | 10/1974 | Barwise | 214/147 G X |

FOREIGN PATENT DOCUMENTS 364,481  5/1973  U.S.S.R. ........................ 214/147 G

Primary Examiner—Frank E. Werner
Attorney, Agent, or Firm—Wells, St. John & Roberts

[57] ABSTRACT

A wheel tractor that includes facilities for skidding logs and a loading assembly by which the logs may be loaded onto a truck. The wheel tractor includes an upright log skidding arch at a rearward end thereof. Winchlines are played out over rollers provided with this arch to be attached to felled trees. Felled logs are attached to several separate winchlines or choker assemblies. The engaged logs are skidded by the tractor to positions adjacent the rearward tractor end. The tractor then skids the logs to a truck loading area. The logs are unhooked from the winchlines and the integral loader assembly is operated to load the logs onto a waiting truck. The loading assembly includes a framework that mounts to the rearward tractor framework astride the upright arch. Loading boom members are mounted to the loader framework. They include grapples at outward free ends that operate to hold logs while the boom members are raised and lowered by a pair of boom operating cylinders. The complete loader assembly is mounted clear of the arch and winchlines when in operation.

3 Claims, 5 Drawing Figures

COMBINED LOG SKIDDER AND LOADER

BACKGROUND OF THE INVENTION

The present invention relates to logging skidding and loading equipment and particularly to mobile skidding and tractor loading units.

It is well known in the field of logging to provide a wheel supported tractor having an "arch" at a rearward end thereof for enabling skidding of logs from their cut locations to a loading area. Such an arch unit is ordinarily comprised of a substantially upright boom having freely rotatable rollers at an upward end thereof. Winchlines extend from a winch on the tractor unit, over the rollers to be attached by choker assemblies to the cut logs or "turn". Once the chokers are set, the winch is operated to pull the logs to the rearward end of the tractor. In doing so, the forward log ends are hoisted slightly off the ground so the hoisted leading log ends will not drag as the tractor is driven forwardly to a loading area. After the logs have been skidded to a loading area, the choker assemblies are disconnected and the tractor returns to the cutting area to skid the next "turn".

A loading mechanism separate from the skidding tractor is ordinarily provided either separate from the logging truck or mounted directly to each logging truck. The mechanism usually includes a grapple for engaging successive "turns" of logs and loading them onto trucks.

The above two separate implements (skidders and loaders) are conventionally utilized for log skidding and loading operations. Each implement requires a separate operator and each is individually powered by its own drive mechanisms.

It is desirable in the interest of economy to utilize a single implement for both skidding and loading purposes. By combining two such implements, a single drive unit may be utilized as well as a single operator. Such a provision would substantially reduce operating costs and the number of workers required at a logging site.

U.S. Pat. No. 3,630,246 discloses a modified skidder and felling head. This unit includes a tree cutting head mounted on an articulated boom of a wheel driven tractor. This boom operates both to cut and locate the individual felled trees in a central pile to be engaged and held within a single loop of a retractable cable. The boom is comprised of a single arm that is centrally mounted to a specialized framework in direct alignment with the framework that controls the flexible cable. Such a device, though serviceable for its intended purpose, is not structurally similar and would not function to accomplish the purposes of my invention as set forth in this application.

SUMMARY OF THE INVENTION

A wheel tractor is disclosed of the type including a forward and rearward pair of ground engaging wheels that support a tractor framework. The tractor framework includes an upright log skidding arch at a rearward end for playing out and taking up a winchline from a powered winch. An improvement in combination with the above tractor includes a boom framework that is mounted to the tractor framework between the pairs of wheels and astride the log skidding arch. A pair of elongated boom members are mounted to the boom framework on opposite sides of the skidding arch. The boom members pivot about a horizontal boom axis that is forward of the rear pair of wheels. The booms extend to free boom ends clear of the skidding arch. A pair of log grapples are located at the free boom ends. They are operative to open and close about one or more logs. Cylinder means connect the boom framework and boom members and operate to lift and lower the boom members and grapples about the horizontal axis.

It is a first object of the present invention to provide a combination log skidder and loader whereby one operator may skid a turn from a cutting location to a loading location and subsequently load the turn onto a truck.

It is a further object to provide such a device wherein the loading unit is mounted to the implement so as not to interfere with operation of the skidding mechanisms.

A still further object is to provide such a loading assembly that may be utilized with the skidding assembly to anchor the tractor unit while the skidding assembly is utilized in difficult pulling situations.

An additional object is to provide such a unit that is substantially less expensive to manufacture than separate skidding and loading units and will therefore be considerably less expensive to purchase than units for accomplishing the skidding and loading functions separately.

These and still further objects and advantages will become apparent upon reading the following detailed description which, taken with the accompanying drawings, disclose a preferred form of my invention. It should be noted however, that the description and drawings are given only by way of example to illustrate a preferred form of the present invention. They are not intended to restrict the scope of the present invention. Such restrictions are set out explicitly within the claims found at the end of the application.

DETAILED DESCRIPTION OF A PREFERRED EMBODIMENT

Figure 1:
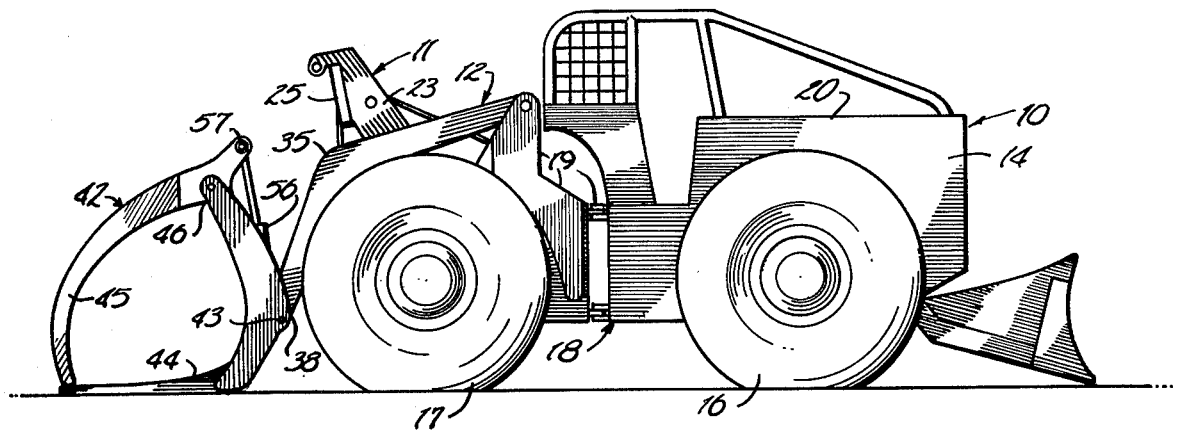
FIG. 1 is a side elevational view of a tractor incorporating the present improvements.

A tractor incorporating the present invention is illustrated in the accompanying drawings and is generally designated therein by the reference character 10. The tractor includes a tractor framework 18 having a forward section 14 and a rearward section 15. The tractor 10 also includes an upright skidding arch 11 and in integral log loading assembly 12. The sections 14 and 15 are articulated about a central pivot 19. The frame sections are supported by forward and rearward wheel pairs 16 and 17. The tractor framework 18 provides support to the tractor through the ground supporting wheels 16 and 17. Tractor 10 includes a forward engine compartment 20 that is supported by front wheels 16. The engine and drive train account for a major part of the total vehicle weight. They thus act as counterweights against the loader when in operation.

Figure 2:
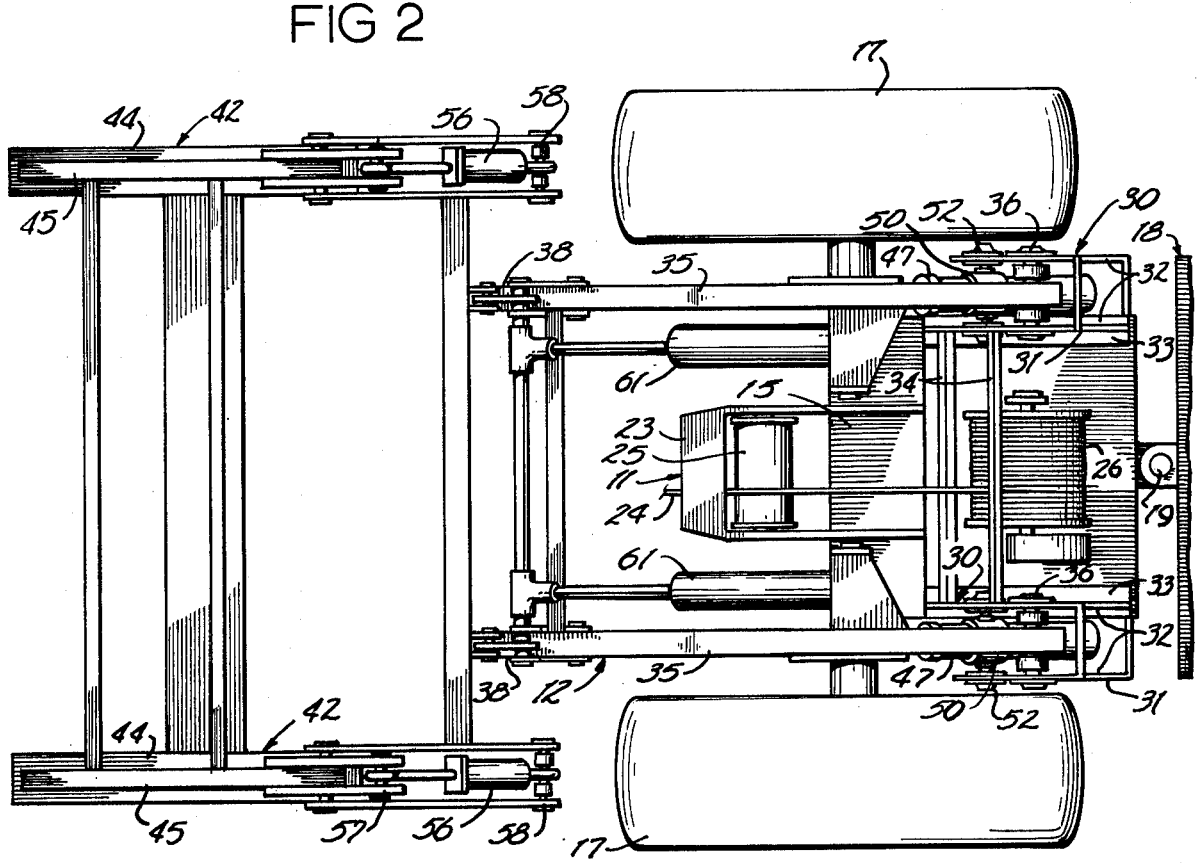
FIG. 2 is an enlarged fragmentary plan view.
Figure 4:
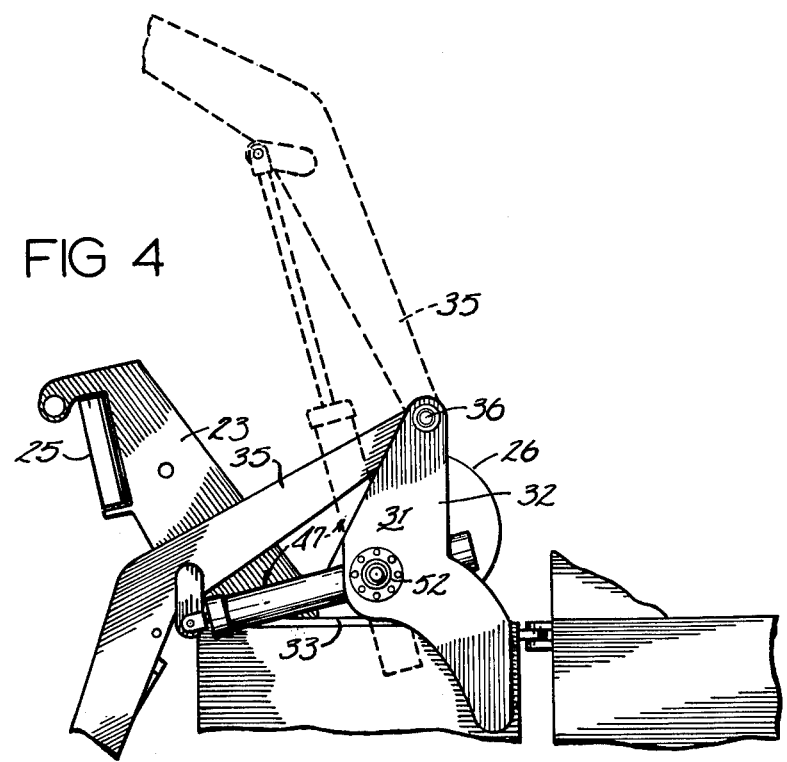
FIG. 4 is a fragmentary side elevational view illustrating the operation of elements incorporated in my invention.
Figure 5:
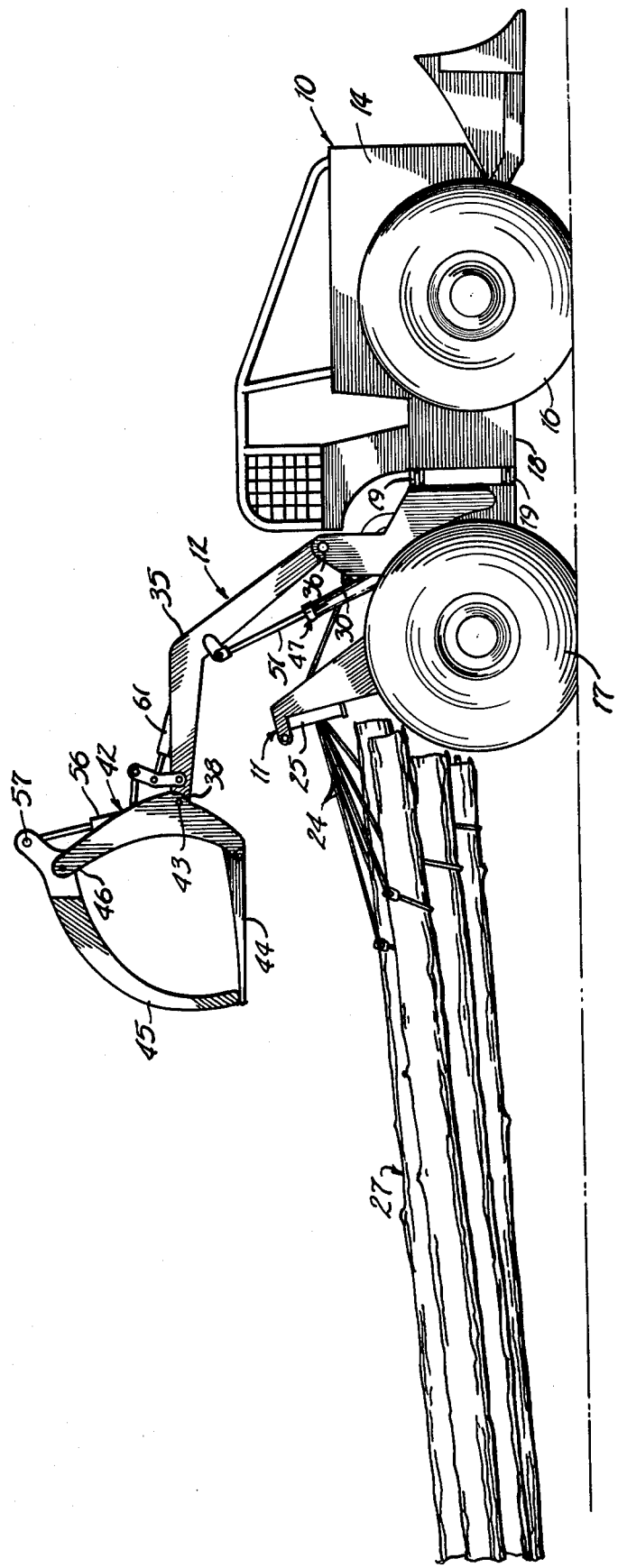
FIG. 5 is a side elevational view illustrating the operation of the present invention.

The upright skidding arch 11 is shown in some detail by FIGS. 2, 4, and 5. Arch 11 includes an upright arch frame 23. One or more winchlines 24 are played over rollers 25 on the arch frame 23. Winchlines 24 are connected to a conventional winch 26 provided on the tractor 10.

The tractor and arch structure as described thus far is conventionally utilized for skidding "turns" 27 (FIG. 5) of logs from a cutting area to a loading area. It is the unique combination of the tractor 10 and arch 11 with the loader mechanism 12 that is the primary concern of this application.

The loader mechanism 12 is shown in substantial detail by FIGS. 2 through 5. Loader 12 is mounted to the rearward section 15 of tractor frame 18 astride the skidding arch 11. A loader frame 30 mounts the loader to the tractor framework. The loader frame 30 is comprised of opposed bracket members 31 that are situated on opposite sides of the upright arch 11 and between the forward and rearward wheel pairs 16 and 17. It is important to locate the components of loader 12 clear of the skidding arch 11 to avoid all possible interference between the loader components and winchlines that are fed from the arch 11 to a turn of logs.

The opposed bracket members 31 are each comprised of a spaced pair of plates 32. A longitudinal foot 33 joins each pair of plates 32 rigidly to the tractor frame 18. Cross bar braces 34 extend between the opposed bracket members 31 to provide lateral stability thereto without interferring with the upright skidding arch 11 or winch 26.

Elongated boom members 35 (FIGS. 4 and 5) are pivotably mounted to the bracket members 31 at coaxial pivots 36. These pivots 36 are aligned along a fixed horizontal axis.

Each boom member 35 includes an inside boom end 37 and a free extended boom end 38. The ends 37 are pivotably mounted between the plates 32 at the pivots 36. The booms extend upwardly and rearwardly from pivots 36 to the free end 38 on opposite sides of the skidding arch 11.

Each boom member 35 carries at its free end 38, a grapple mechanism 42. The grapple mechanisms shown are conventionally used in log loading operations. They are mounted to the boom members 35 at pivots 43 that are aligned and coaxial. Each grapple 42 includes a lower jaw member 44 and an upper jaw member 45. Members 44 and 45 are pivoted at 46 about a common horizontal axis to open and close about select groups of logs.

The jaws 44 and 45 are powered to pivot about the jaw pivot axes by grapple operating hydraulic cylinders 56 which are operatively connected between the pivotably connected sets of jaw members. Each cylinder 56 includes an end 57 connected to a jaw member 44 and a remaining end 58 (FIG. 2) connected to the other jaw member 45. Extension and retraction of the cylinders 56 serves to open and close the jaws about the pivots 46.

An additional hydraulic cylinder 61 is provided between each boom member 35 and its associated grapple 42. Cylinders 61 are utilized to pivot the entire grapple assemblies about a horizontal axis at pivots 43. Appropriate linkage may be provided between the cylinders and grapples 42 to attain greater mechanical advantage or to decrease the required stroke length of the cylinders.

It is not intended to restrict this application to specific details of the grapple assemblies since there are many available forms thereof that will operate effectively in combination with the present improvement. Therefore, additional detailed features of the grapples will not be discussed.

Figure 3:
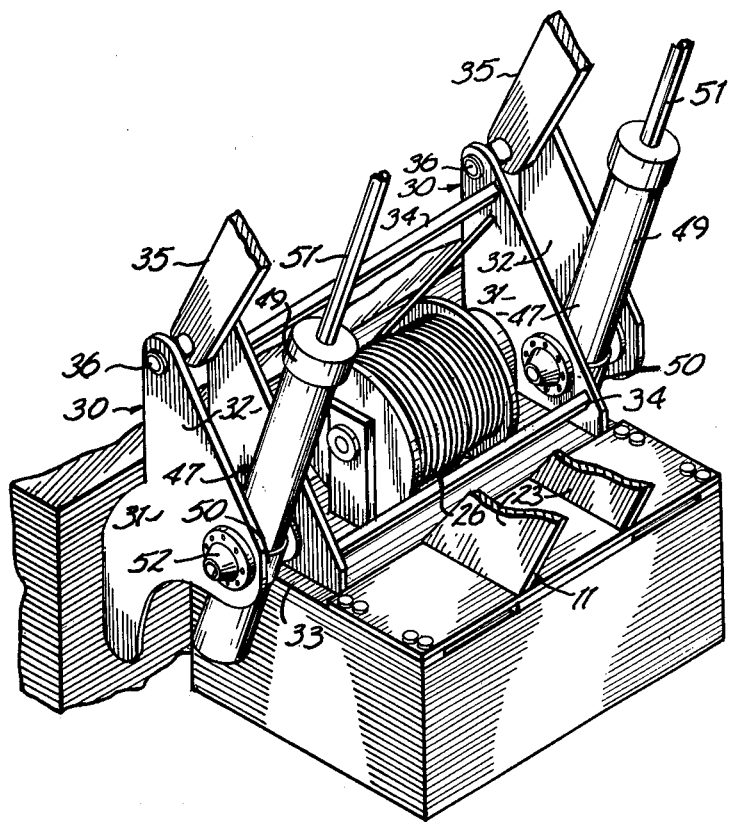
FIG. 3 is a pictorial fragmentary view of a portion of my invention.

The loader 12 is operated to raise and lower its boom members 35 through means of a pair of boom lift cylinders 47. These cylinders 47 operatively interconnect the boom members 35 and loader frame 30. FIG. 3 shows, in substantial detail, the specific arrangement of the cylinders 47 in relation to the loader frame 30.

Each cylinder 47 includes a hydraulic cylinder body 49 and an extendable and retractable piston 51. Cylinder bodies 49 each include a central mounting trunnion 50 that is received within appropriate bushings 52 in the loader frame 30. The bushings and trunnions define a horizontal pivot axis for the cylinders that is spaced rearwardly of the boom pivot axis but forwardly of the arch 11. It is important to the operation of the present invention that this particular relationship exist. It is also important that the cylinders be mounted to the frame 30 at points intermediate the ends of the cylinder body 49. Through these provisions, I am able to utilize a relatively lengthy cylinder stroke while minimizing the nonfunctional length of the cylinder for clearance between the loader frame 30 and skidding arch 11. Further, the rearward location of the pivot axis enables pivotal movement of the boom members 35 toward an upright or vertical condition (FIG. 4, dotted lines). This guarantees that the grapples 42 and remaining loader assembly may be held clear of the upright arch 11.

The cylinders 47, as may be noted in FIG. 2, are in vertical alignment with the boom members 35. This is an additional feature in which maximum clearance is provided between the arch and boom members. The clevis ends of the cylinder pistons 51 are connected directly to lower sides of the boom members and operate along cylinder axes that are in vertical planar alignment with the side faces of boom member 35.

In operation, the vehicle is first moved with the loader elevated (as in FIG. 5) to a location where one or more trees have been cut. Often, it is required that a blade be provided at the forward tractor end in order to form a rough roadway to the felled trees. Once the tractor is properly located, the winch is actuated to play out the individual winchlines or one winchline having several "choker" assemblies attached thereto. A "choker setter" takes each choker (provided at the end of each winchline) and "sets" the choker about a log. The winch is then actuated to take up the winchlines through the skidding arch. If several logs are connected to the winchlines, they will be gathered in a "turn" 27 at the rearward tractor end as is shown in FIG. 5.

The winch is ordinarily operated until the leading end of the turn is lifted slightly above the ground surface. All this time the loader is held in an upraised position with the grapples 42 located upwardly clear of the arch 11.

When the turn is held as shown in FIG. 5, the tractor is operated to skid the turn to a loading area. After arriving at the loading area, the turn is released from the winchlines, and the tractor is maneuvered around to facilitate operation of the loader 12. The boom members are lowered and the grapples opened to engage and grip a selected number of logs or in some instances, the whole turn. The logs are then lifted by the boom members and moved to a position above a truck. The booms are then again lowered and the grapples opened to transfer the logs to the truck. The grapples are moved vertically by the cylinders 47 about the boom pivot axis. Other positioning of the loader is accomplished by physically moving the tractor since the loader will not pivot about a vertical axis.

An additional feature of the present invention is its use when it is desirous to skid relatively heavy loads. In this situation, before the winchlines are played out, the loader is operated to move the grapples 42 downwardly to an earth engaging position. This serves to anchor the tractor in a stationary position against pulling forces applied to extraordinarily heavy loads. After anchoring the grapples 42, the winchlines may be played out and connected to the load. The winch is then operated to retract the winchlines and pull against the anchored weight of the tractor to move the load toward the tractor rearward end. As the load reaches a position slightly rearward of the grapples 42, the winch is deactivated and the choker lines disconnected to allow upward pivoted movement of the grapples 42. The chokers may then again be set and the turn moved so the forward log ends are slightly lifted above the ground surface. The load may then be moved to a log loading area where the loading steps are performed as described above.

It may have become obvious from the above description that various changes and modifications may be made therein. It is therefore intended that only the following claims be taken as restrictions of my invention.

What I claim is:

1. In combination with wheel tractor of the type including an articulated tractor framework having forward and rearward pair of ground engaging wheels respectively supporting forward and rearward sections of the framework, the forward and rearward sections being pivoted with respect to one another about an upright axis;

said framework having an upright log skidding arch mounted to the rearward section thereof for playing out and taking up a winchline from a powered winch on the rearward section of the framework; the improvement comprising:

a loader framework mounted to the rearward section of the tractor framework between the rearward pair of wheels and astride the log skidding arch;

a pair of elongated boom members pivotally mounted to the loader framework at opposite sides of the skidding arch about a common horizontal boom axis positioned forward of the rearward pair of wheels, said boom members extending outward from said boom axis in parallel upward and rearward directions to free boom ends that clear the skidding arch;

a pair of log grapples mounted to the free boom ends about axes parallel to the boom axis, said log grapples being operative to open and close about one or more logs for loading purposes; and cylinder means connecting the loader framework and the boom members, for lifting and lowering the boom members and grapples by pivotal movement thereof about the boom axis;

said cylinder means comprising:

individual hydraulic cylinder assemblies at each side of the skidding arch, each cylinder assembly including a cylinder body and an extensible piston member;

the respective cylinder assemblies being located beneath and to the rear of the boom members;

the respective cylinder bodies each being pivotally mounted to the loader framework about a common pivot axis that is both parallel to and spaced from said boom axis;

the outer ends of the respective piston members being pivotally mounted to the boom members about a common axis that is both parallel to and spaced along the boom members outward from the boom axis;

whereby the log grapples mounted to the boom members are capable of being raised in a forward direction about the boom axis in response to pivotal movement of the boom members due to extension of the piston members with respect to the cylinder bodies of the individual hydraulic cylinder assemblies.

2. The improvement as set out in claim 1 wherein each hydraulic assembly is in vertical planar alignment with its associated boom member.

3. The improvement as set out in claim 2 wherein each cylinder body is mounted to the loader framework about said common pivot axis at a location situated between the longitudinal ends of the respective cylinder bodies.

* * * * *